US010843421B2

(12) United States Patent
    Corbett (10) Patent No.: US 10,843,421 B2
(45) Date of Patent: Nov. 24, 2020

(54) REPAIR INCLUDING A CHAMFERED BRACKET AND A CHAMFERED BRACKET COMPONENT FOR REINFORCING A DAMAGED STRUCTURAL ELEMENT MADE FROM COMPOSITE MATERIALS

(71) Applicant: SHORT BROTHERS PLC, Belfast (GB)

(72) Inventor: David Corbett, Belfast (GB)

(73) Assignee: SHORT BROTHERS PLC, Belfast (GB)

( * ) Notice: Subject to any disclaimer, the term of this patent is extended or adjusted under 35 U.S.C. 154(b) by 242 days.

(21) Appl. No.: 15/737,432

(22) PCT Filed: Jun. 17, 2016

(86) PCT No.: PCT/GB2016/051814
    § 371 (c)(1),
    (2) Date: Dec. 18, 2017

(87) PCT Pub. No.: WO2017/001821
    PCT Pub. Date: Jan. 5, 2017

(65) Prior Publication Data
    US 2018/0169979 A1    Jun. 21, 2018

(30) Foreign Application Priority Data

Jun. 30, 2015 (GB) .................................. 1511402.8

(51) Int. Cl.
    *B29C 73/14*    (2006.01)
    *B29C 65/48*    (2006.01)
    (Continued)

(52) U.S. Cl.
    CPC .............. *B29C 73/14* (2013.01); *B29C 65/48* (2013.01); *B29C 65/562* (2013.01);
    (Continued)

(58) Field of Classification Search
    CPC ......... B29C 73/14; B29C 73/04; B29C 65/48; B29C 65/562; B29C 66/1286; B29L 2031/3076; B29L 2031/7172
    See application file for complete search history.

(56) References Cited

U.S. PATENT DOCUMENTS

| 1,906,683 | A | * | 5/1933 | Weiskopf | ................. | E04C 3/06 |
|           |   |   |        |          |                  | 52/838    |
| 3,289,362 | A | * | 12/1966 | Whelan  | ..................... | E04B 7/04 |
|           |   |   |        |          |                  | 52/92.2   |

(Continued)

FOREIGN PATENT DOCUMENTS

| CN | 101437913 A | 5/2009 |
| EP | 0564194 A2  | 10/1993 |

(Continued)

OTHER PUBLICATIONS

International Search Report and Written Opinion dated Sep. 8, 2016, for International Patent Application No. PCT/GB2016/051814.

(Continued)

*Primary Examiner* — Anita M King
(74) *Attorney, Agent, or Firm* — Karceski IP Law, PLLC (57) ABSTRACT

A repair for a structural element made from a composite material includes a bracket defining a first surface and a second surface. The first surface is adapted for facing the structural element. A chamfer is located on a first end of the bracket. An angle is defined between a plane of the chamfer and a plane of the first surface, the first surface of the bracket being adapted to be disposed adjacent to a side of the structural element. The repair also includes a sealant material between the bracket and the structural element, where the sealant material occupies a space established between the chamfer and the structural element.

11 Claims, 5 Drawing Sheets

(51) Int. Cl.
*B29L 31/30* (2006.01)
*B29C 65/00* (2006.01)
*B29C 73/04* (2006.01)
*B29C 65/56* (2006.01)
*B29L 31/00* (2006.01)

(52) U.S. Cl.
CPC .......... *B29C 66/1286* (2013.01); *B29C 73/04* (2013.01); *B29L 2031/3076* (2013.01); *B29L 2031/7172* (2013.01)

(56) References Cited

U.S. PATENT DOCUMENTS

| | | | |
|---|---|---|---|
| 3,646,816 A | 3/1972 | Hance et al. | |
| 3,670,466 A * | 6/1972 | Lynch | E04C 2/292 52/211 |
| 4,109,435 A | 8/1978 | Loyd | |
| 4,588,262 A | 5/1986 | Nelson | |
| 5,665,187 A | 9/1997 | Mackellar | |
| 6,145,268 A * | 11/2000 | Korzen | E04B 7/08 52/712 |
| 9,316,004 B1 * | 4/2016 | Hatzinikolas | F16M 13/02 |
| 2007/0256776 A1 | 11/2007 | Keicher | |
| 2007/0262219 A1 * | 11/2007 | Hutter, III | B64C 1/406 248/229.1 |
| 2010/0224724 A1 | 9/2010 | Kamino et al. | |
| 2011/0045232 A1 | 2/2011 | Kismarton | |
| 2012/0061006 A1 | 3/2012 | Marquardt | |
| 2012/0104166 A1 | 5/2012 | Pina Lopez et al. | |
| 2012/0280083 A1 | 11/2012 | Dazet | |
| 2012/0308770 A1 | 12/2012 | Eli-Eli et al. | |
| 2013/0026297 A1 | 1/2013 | McCullough et al. | |
| 2013/0164489 A1 | 6/2013 | Gaitonde et al. | |
| 2014/0096991 A1 | 4/2014 | Kawahara et al. | |
| 2014/0203477 A1 | 7/2014 | Chapman et al. | |
| 2014/0224043 A1 | 8/2014 | Tighe | |
| 2014/0295123 A1 | 10/2014 | Mizuno et al. | |
| 2015/0013902 A1 | 1/2015 | Morral et al. | |
| 2015/0059142 A1 | 3/2015 | De Jong et al. | |
| 2015/0102160 A1 | 4/2015 | Watanabe et al. | |

FOREIGN PATENT DOCUMENTS

| | | |
|---|---|---|
| EP | 2848394 A1 | 3/2015 |
| RU | 2010110923 A | 9/2011 |
| WO | 03018295 A1 | 3/2003 |
| WO | 2007030371 A2 | 3/2007 |

OTHER PUBLICATIONS

Chinese Office Action dated Apr. 18, 2019, for Chinese Patent Application No. 201680036218.X.

* cited by examiner

REPAIR INCLUDING A CHAMFERED BRACKET AND A CHAMFERED BRACKET COMPONENT FOR REINFORCING A DAMAGED STRUCTURAL ELEMENT MADE FROM COMPOSITE MATERIALS

CROSS-REFERENCE TO RELATED APPLICATION(S)

This patent application is a national stage entry from International Patent Application No. PCT/GB2016/051814, filed on Jun. 17, 2016, and which claims priority to GB patent application no. 1511402.8, filed on Jun. 30, 2015, the entire content of both of which are incorporated herein by reference.

FIELD OF THE INVENTION

The present invention concerns a chamfered bracket component for reinforcing a damaged structural element made from a composite material. The present invention also concerns a method of repairing a damaged structural element via a chamfered bracket. More specifically, the present invention concerns a method of repairing a damaged structural element in an aircraft using a chamfered, metal bracket.

DESCRIPTION OF THE BACKGROUND AND RELATED ART

In the prior art, when repairing a damaged structural element made from a composite material, it is customary to attach a metal brace or bracket to the structural element.

It is also customary to apply sealant to fill any gaps created between the metal bracket and the damaged structural element.

It is understood that, when applying sealant to fill any gaps between the metal bracket and the structural element, the sealant should be applied to minimize the creation of air bubbles.

As should be apparent to those skilled in the art, if the sealant is exposed to a high voltage, such as might be experienced as a result of a lighting strike, any gases trapped in an air bubble in the sealant might become heated to a sufficiently high temperature to cause the bubble to burst. This may result in damage to the sealant and associated components.

Where bubbles are present in sealant in an aircraft fuel tank, there is an increased risk that the bubbles might burst, damaging the fuel-tight sealing of the fuel tank or creating an unwanted ignition risk.

Other potential difficulties associated with prior art repairs also should be apparent to those skilled in the art.

Accordingly, an improved repair for improving sealing of a damaged structural element made from composite material is desired.

SUMMARY OF THE INVENTION

The present invention addresses one or more of the deficiencies with respect to the prior art.

In particular, the present invention provides for a repair for a structural element made from a composite material. The repair includes a bracket defining a first surface and a second surface. The first surface is adapted for facing the structural element. A chamfer is located on a first end of the bracket. An angle is defined between a plane of the chamfer and a plane of the first surface, the first surface of the bracket being adapted to be disposed adjacent to a side of the structural element. The repair also includes a sealant material between the bracket and the structural element. The sealant material occupies a space established between the chamfer and the structural element.

It is contemplated that the bracket may defines a first side, a second side, and a third side, the second side extending between the first side and the third side. If so, the chamfer is contemplated to extend between a first position on the first side and a second position on the second side.

In one contemplated embodiment, the chamfer defines a chamfer thickness as a distance measured from the first position to the second position along a line normal to the plane of the first surface. A bracket thickness is defined as a distance measured from the first side to the third side along the line normal to the plane of the first surface. The chamfer thickness is less than the bracket thickness.

Alternatively, it is contemplated that the chamfer is a first chamfer, the bracket including a second chamfer located on a second end of the bracket.

In another contemplated embodiment, a polyimide film is disposed between the bracket and the structural element.

It is contemplated that the polyimide film may be positioned between two layers of sealant material.

The bracket may be made from at least one of titanium, alloys of titanium, aluminum, alloys of aluminum, iron, alloys of iron, steel, plastics, composite materials, and ceramics.

The angle of the chamfer is contemplated to lie between about 20°-70°.

The chamfer thickness is contemplated to be at least one of greater than about 0.020 inches (0.51 mm), greater than about 0.025 inches (0.64 mm), greater than about 0.030 inches (0.76 mm), greater than about 0.35 inches (0.89 mm), and greater than about 0.4 inches (1.02 mm).

The ratio of the chamfer thickness to the bracket thickness is contemplated to be at least one of about 0.50, about 0.45-0.55, about 0.40-0.60, or about 0.35-0.65.

In another contemplated embodiment of the repair of the present invention, the repair also may include a second bracket with a construction identical to the first bracket, the second bracket being adapted to be disposed adjacent to a second side of the structural member made from the composite material.

Still further, it is contemplated that the repair may include at least one fastener adapted to connect the bracket to the structural member.

Another aspect of the present invention provides for a chamfered bracket suitable for being connected to a structural element made from a composite material. The chamfered bracket is contemplated to include a first surface and a second surface, the first surface being adapted for facing the structural element and a chamfer located on a first end of the bracket. An angle is contemplated to be defined between a plane of the chamfer and a plane of the first surface, the first surface of the bracket being adapted to be disposed adjacent to a side of the structural element. The chamfer is contemplated to define a chamfer thickness as a distance measured from a first position where the chamfer intersects the first surface to a second position where the chamfer intersects an end surface along a line normal to the plane defined by the first surface. A bracket thickness is defined as a distance measured from the first surface to the second surface along the line normal to the plane defined by the first surface. The chamfer thickness is contemplated to be less than the bracket thickness.

As with the repair, the chamfered bracket is contemplated to include a second chamfer located on a second end of the bracket.

Concerning the chamfered bracket, it is contemplated that at least one layer of sealant material may be applied to the first surface, such that the sealant material occupies a space established between the chamfer and the structural element when installed.

Also concerning the chamfered bracket, a polyimide film may be positioned between two layers of the sealant material.

For the chamfered bracket, the at least one layer of sealant material may be an interfay sealant.

It is contemplated that the chamfered bracket may be made from at least one of titanium, alloys of titanium, aluminum, alloys of aluminum, iron, alloys of iron, steel, plastics, composite materials, and ceramics.

The angle of the chamfer(s) on the chamfered bracket is contemplated to lie between about 20°-70°.

The chamfer thickness for the chamfered bracket is contemplated to be at least one of greater than about 0.020 inches (0.51 mm), greater than about 0.025 inches (0.64 mm), greater than about 0.030 inches (0.76 mm), greater than about 0.35 inches (0.89 mm), and greater than about 0.4 inches (1.02 mm).

For the chamfered bracket, the ratio of the chamfer thickness to the bracket thickness may be at least one of about 0.50, about 0.45-0.55, about 0.40-0.60, or about 0.35-0.65.

The present invention also provides for a method for repairing a damaged structural element made from a composite material. The method includes providing a bracket defining a first surface and a second surface, the first surface being adapted for facing the structural element, and a chamfer located at a first end of the bracket, where an angle is defined between a plane of the chamfer and a plane of the first surface. The method includes applying a sealant material to one of the first surface of the bracket and a side surface of the structural element, placing the bracket adjacent the side surface of the structural element such that the sealant material occupies a space established between the chamfer and the structural element, and connecting the bracket to the structural element via a mechanical fastener.

It is contemplated, for the method, that the method also may include applying a film to the sealant material.

Further aspects of the present invention will be made apparent from the paragraphs that follow.

BRIEF DESCRIPTION OF THE DRAWING(S)

The present invention will now be described in connection with the drawings appended hereto, in which.

DETAILED DESCRIPTION OF EMBODIMENT(S) OF THE INVENTION

The present invention will now be described in connection with one or more embodiments thereof. The discussion of the embodiments is not intended to be limiting of the present invention. To the contrary, any discussion of embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

Figure 1:
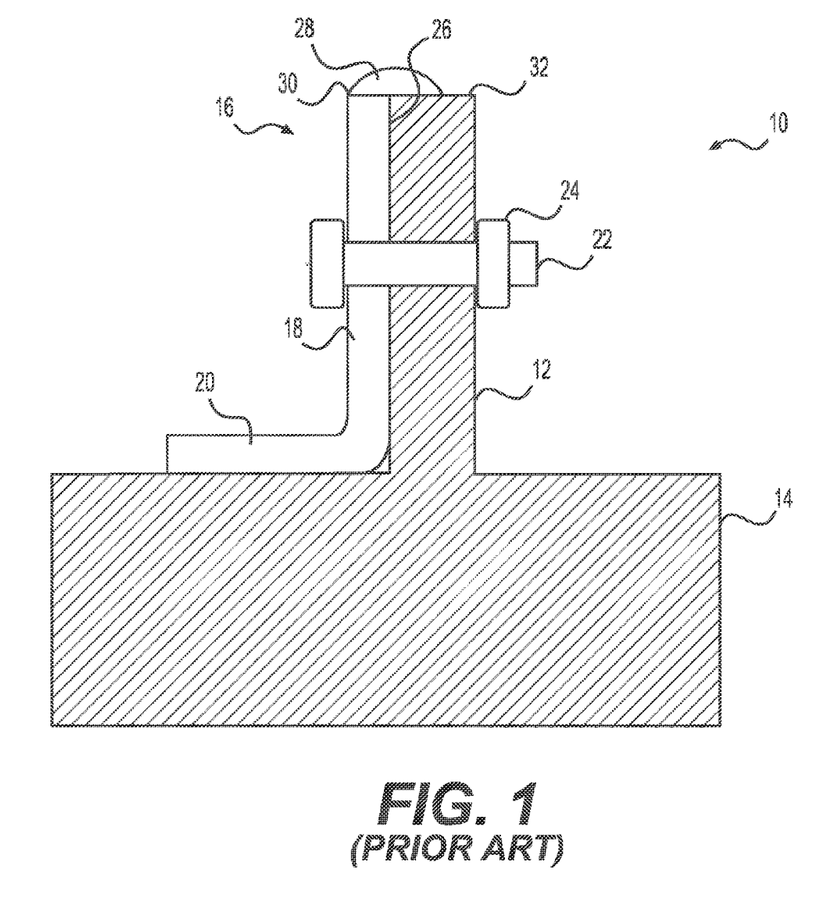
FIG. 1 is a graphical, side view of the construction of a traditional repair for a damaged structural element made from a composite material.

FIG. 1 is a graphical, side view of the construction of a traditional repair 10 for a structural element 12 made from a composite material. In the non-limiting embodiment where the structural element 12 is an aircraft component, the structural element 12 may be a damaged stringer, frame member, spar, or other element, as should be appreciated by those skilled in the art. The structural element 12 may be connected to a substrate 14, such as an aircraft skin for example, as illustrated in FIG. 1.

In order to reinforce the damaged structural element 12, the repair 10 includes a bracket 16. In the illustrated prior art embodiment, the bracket 16 is made from metal and is L-shaped. As such, the bracket 16 includes a vertical segment 18 and a horizontal segment 20. In the illustrated example, the bracket 16 is connected to the structural element 12 via a nut 24 and bolt 22.

As also illustrated in FIG. 1, a gap 26 exists between the bracket 16 and the structural element 12. Air pockets may get trapped within the gap 26 between the bracket 16 and the structural element 12. These air pockets can be dangerous during a lightning strike, since current conduction across the interface between the two parts may cause the air pockets to become super-heated and burst, which could possibly present an unwanted ignition risk within an aircraft fuel tank.

To seal the gap 26, sealant 28 is applied. The sealant 28 bridges the gap 26 and forms a bead that extends from the top end 30 of the bracket 16 to the top end 32 of the structural element 12.

However, due to constant sloshing of fuel within the fuel tank, the bead of sealant 28 can suffer from erosion and get worn down over time. As the bead of sealant 28 wears down, there is a risk that air pockets can form within the gap between the bracket 16 and the structural element 12. More particularly, continued exposure to the flow of fuel within the tank across outer faces 30 and 32 of the repair and structural element will also tend to erode the sealant 28 applied to this interface, resulting in reduced protection of the interface with continued time in service.

Figure 2:
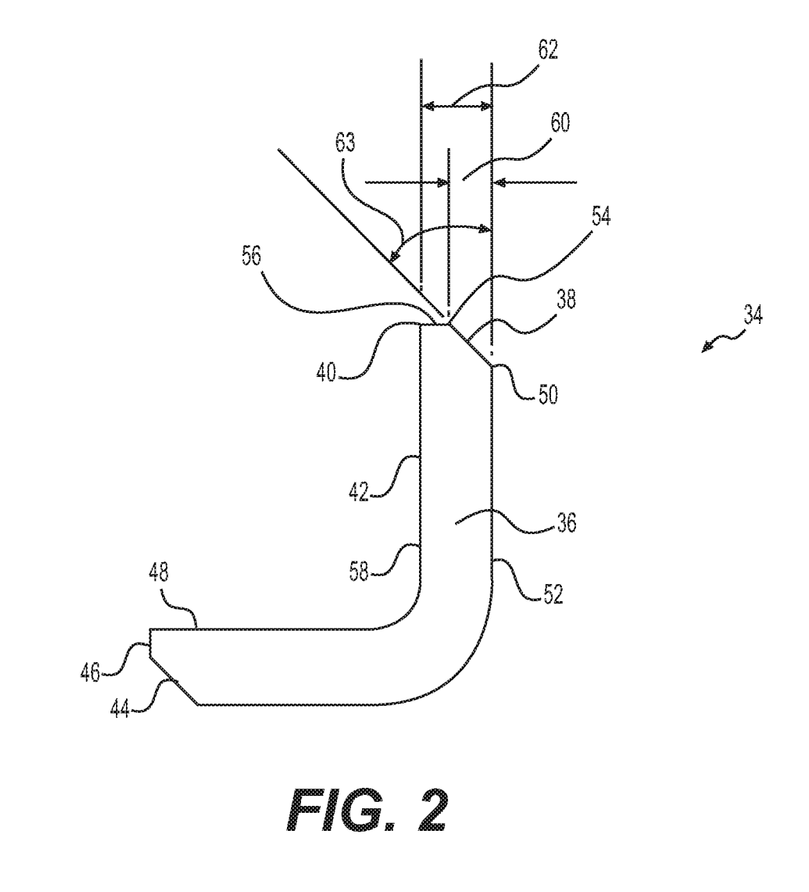
FIG. 2 is a graphical, side view of a portion of a repair for a structural element made from a composite material, as contemplated by the present invention.

To avoid this possible outcome, among others, FIG. 2 illustrates one aspect of the present invention. FIG. 2 provides an enlarged, graphical illustration of a portion of a repair 34 according to the present invention.

As discussed in connection with FIGS. 3 and 4, the repair 34 of the present invention relies upon an L-shaped bracket 36 with a chamfer 38 incorporated at the end 40 of the vertical segment 42 and a chamfer 44 incorporated at the end 46 of the horizontal segment 48. In connection with the discussion of the present invention, it is noted that the terms "vertical" and "horizontal" are employed with reference to the orientation in the figures. The terms "vertical" and "horizontal" should not be understood to be limiting of the present invention.

As illustrated in FIG. 2, the chamfer 38 extends from a first position 50 on a first side 52 of the bracket 36 to a second position 54 on a second side 56 of the bracket 36. The second side 56 of the bracket 36 is located at the top end 40 of the bracket 36 and is, therefore, the top side of the bracket 36 in this embodiment. It is noted that the first side 52 of the bracket 36 is the side facing toward the structural element 12. For clarity, the third side 58 of the bracket 36 is the side facing away from the structural element 12.

The thickness 60 of the chamfer 38 (also referred to as the chamfer thickness 60) is the distance from the first position 50 to the second position 54, as measured along a line that is perpendicular (normal) to a plane defined by the first side 52. It is noted that, for the illustrated embodiment, the first side 52 is contemplated to be parallel to the third side 58. The second side 56 is contemplated to be perpendicular both to the first side 52 and to the third side 58. It is noted that the orientations of the first side 52, the second side 56, and the third side 58 may differ from the construction illustrated without departing from the scope of the present invention.

As illustrated in FIG. 2, the thickness 60 of the chamfer 38 is less than the thickness 62 of the bracket 36 (also referred to as the bracket thickness 62). The bracket thickness 62 is measured between the first side 52 and the third side 58 also along a line perpendicular (normal) to a plane defined by the first side 52. With this construction, the second position 54 lies on the second side 56, between the first side 52 and the third side 58. It should however be appreciated that in an alternative embodiment, the chamfer 38 may extend between the first side 52 and the third side 58, such that the top end 40 is defined entirely by the chamfer 38.

With the construction of the chamfer 38 described, it is contemplated that the angle 63 of the chamfer 38 will be about 45°. The angle 63 is measured as the angle defined between a plane defined by the chamfer 38 and a plane defined by the first surface 52. In the alternative, it is contemplated that the angle 63 may lie in a range between about 45°±2°, about 45°±5°, about 45°±7°, or about 45°±10° without departing from the scope of the present invention. In a further alternative, it is contemplated that the angle 63 may lie anywhere in a range of between 20° and 70° without departing from the scope of the present invention.

The thickness 60 is contemplated to be greater than about 0.020 inches (0.51 mm). Alternatively, the thickness may be greater than about 0.025 inches (0.64 mm), greater than about 0.030 inches (0.76 mm), greater than about 0.35 inches (0.89 mm), or greater than about 0.4 inches (1.02 mm) without departing from the scope of the present invention.

The ratio of the chamfer thickness 60 to the bracket thickness 62 is contemplated to be about 0.50. In alternative embodiments, the ratio may be between about 0.45-0.55, about 0.40-0.60, or about 0.35-0.65 without departing from the scope of the present invention. By relying on a ratio, the present invention is considered to be scalable to any thickness of the bracket 36 without departing from the scope of the present invention.

It is noted that the construction and dimensioning of the chamfer 44 at the end 46 is contemplated to be the same as the chamfer 38. However, the angle of the chamfer 44 is measured as the angle defined between a plane defined by the chamfer 44 and a plane defined by a bottom surface of the horizontal segment 48. The construction and dimensioning of the chamfers 38, 44 may differ from one another without departing from the scope of the present invention. It is also noted that the chamfer 44, like the chamfer 38, also faces the structural element 12 or the substrate 14 to which the bracket 36 is attached, as discussed in greater detail with respect to FIGS. 3 and 4.

Figure 3:
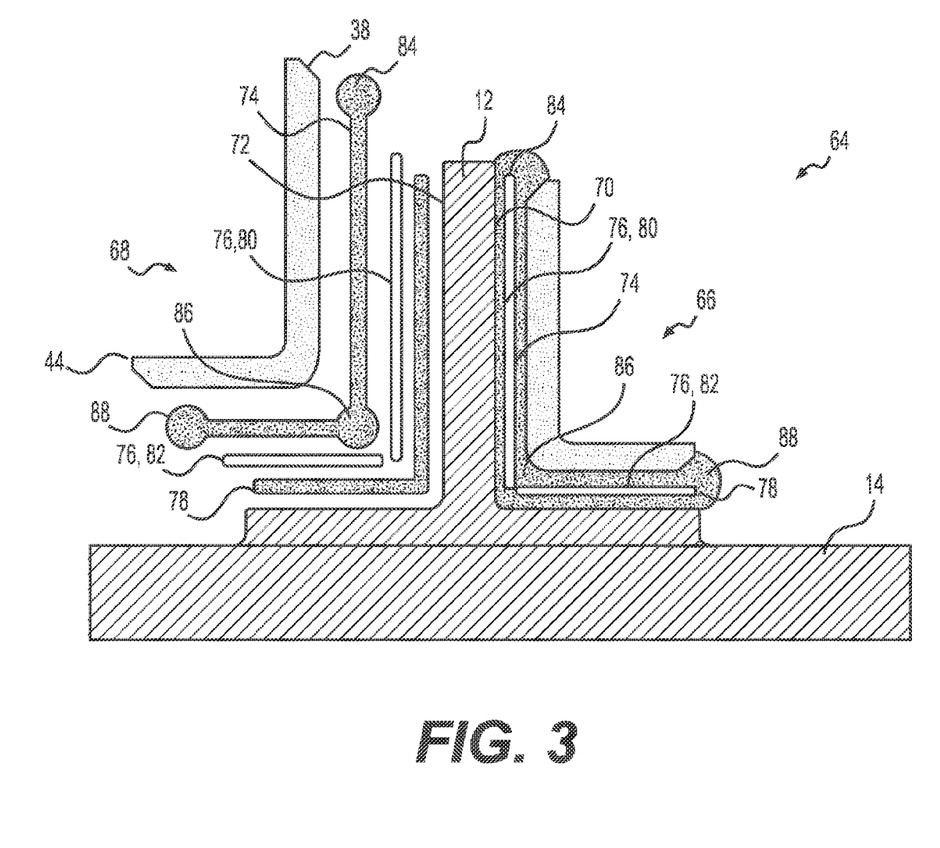
FIG. 3 is a graphical, side view of the construction of a first embodiment of a repair for a structural element made from a composite material, as contemplated by the present invention.

Reference is now made to FIG. 3, which illustrates a repair 64 contemplated to fall within the scope of the present invention. FIG. 3 illustrates a repair 64 that includes a first bracket 66 and a second bracket 68. The first bracket 66 and the second bracket 68 are contemplated to have the same construction as described in connection with the bracket 36. Here, the first bracket 66 and the second bracket 68 are contemplated to have identical structures. However, to practice the present invention, the first bracket 66 and the second bracket 68 do not need to be identical in construction.

As illustrated, the first bracket 66 connects to a first side 70 of a structural element 12. The second bracket attaches to a second side 72 of the structural element 12. To facilitate discussion of the present invention, the construction of the repair 64 associated with the second bracket 68 is provided in exploded detail. The construction of the repair associated with the first bracket 66, in contrast, is shown in the assembled condition as might appear on an aircraft.

The first and second brackets 66, 68 are contemplated to be made from metal. Suitable metals include, but are not limited to titanium, alloys of titanium, aluminum, alloys of aluminum, iron, alloys of iron, steel, plastics, composite materials, and ceramics. In the illustrated embodiment, the first and second brackets 66, 68 are made from titanium, which offers light weight and high strength for the repair 64. The first and second brackets 66, 68 do not need to be made from the same material to practice the present invention.

The first and second brackets 66, 68 are L-shaped in this embodiment. While the first and second brackets 66, 68 are illustrated as being L-shaped, the first and second brackets 66, 68 may have any alternative shape without departing from the scope of the present invention.

There are three layers between the first and second brackets 66, 68 and the structural element 12. The first layer 74 comprises a first sealant, such as an interfay sealant. The second layer 76 is an interlayer comprising a polyimide. The third layer 78 comprises a second sealant, such as an interfay sealant. In the illustrated embodiment, the first and second sealants are contemplated to be the same, but this is not required to practice the present invention.

The layers of interfay sealant 74, 78 may be any suitable sealant that helps to insulate against electricity transfer. More particularly, the layers of sealant 74, 78 provide the dual function of preventing lightning strike from transferring into the skin of the aircraft as well as to reduce the air pockets between the brackets 66, 68 and the structural element 12. In addition, the layer of polyimide 76, is included between the composite structural element 12 and the metallic brackets 66, 68 in order to isolate the metal from the carbon in order to avoid corrosion. The layers of material 74, 76, 78 may be any suitable materials known in the art for at least partially achieving these functions.

While the present invention is described in connection with the first layer 74, the second layer 76, and the third layer 78, the present invention should not be considered to be limited solely to a three layer construction. At a minimum, it is contemplated that the present invention will incorporate at least the first layer 74. Alternatively, the present invention may incorporate more than three layers, as required or as desired.

The brackets 66, 68 may be pre-fabricated to incorporate all three layers 74, 76, 78. In this contemplated embodiment, the brackets 66, 68 and the layers 74, 76, 78 are presented as chamfered bracket components 118, a typical example of which is illustrated graphically in FIG. 5 in exploded detail. To effectuate the repair 64, therefore, all that is necessary is for the chamfered bracket components 118 to be placed against the damaged structural element 12 to reinforce the damaged structural element 12.

Figure 5:
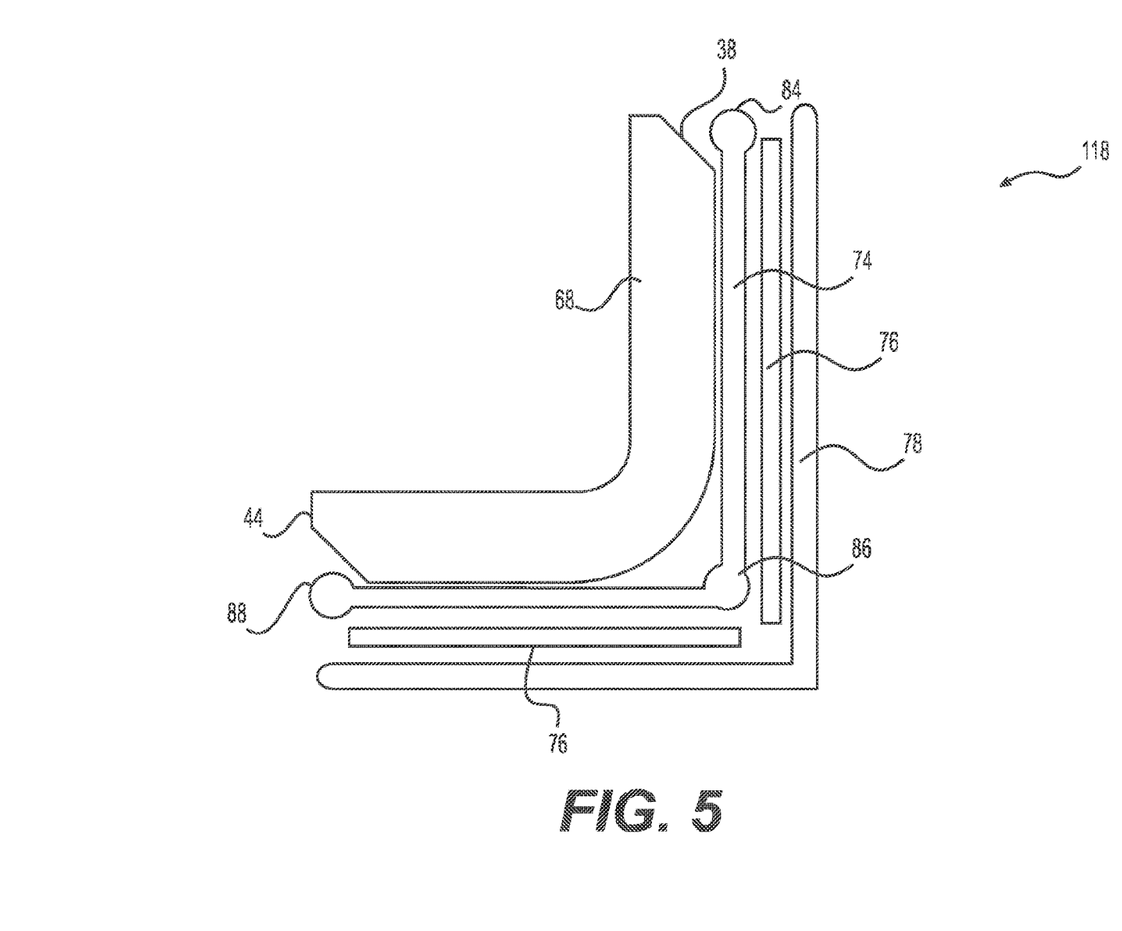
FIG. 5 is a graphical, side view of a chamfered bracket component according to the present invention.

To construct a chamfered bracket component 118, the first layer 74 is applied to the bracket 66, 68. The second layer 76 is then applied to the first layer 74. The third layer 78 is then applied to the second layer 76. The chamfered bracket component 118 may then be positioned adjacent to the damaged structural element 12, as an integral component, to effectuate the repair 64, for example.

Alternatively, the repair 64 may be assembled in situ on the aircraft by constructing the repair 64 directly onto the structural element 12. Here, it is contemplated that the third layer 78 of interfay sealant will first be applied to the damaged structural element 12. As noted above, the damaged structural element is contemplated to be a stringer, brace, spar, or other element made from a composite material. After the third layer 78 of sealant is deposited, the second layer 76 is placed thereon. After placement of the second layer 76, the first layer 74 is deposited over the second layer 76. The bracket 66, 68 is then fitted onto the first layer 74, in contact with the first layer 74.

As necessary, the repair 64 may be cured by any methodology understood by those skilled in the art. In the alternative, it is contemplated that the repair 64 may be effectuated without curing. If curing is required, it is contemplated that the curing may require application of heat and/or a vacuum to the repair 64. Where a vacuum is required, it may be necessary to position a vacuum bag over the repair 64, as should be appreciated by those skilled in the art.

In the illustrated examples, the first layer 74 may be applied as a liquid, as a solid, as a powder, or as a film. It is contemplated that the first layer 74 will be applied as a liquid or as a film, but the present invention should not be considered to be limited solely to these contemplated constructions.

The second layer 76 is contemplated to be applied as two sheets of polyimide film, which are designated as a first film 80 and a second film 82. As should be apparent to those skilled in the art, however, the second layer 76 may be applied as an integral, single layer without departing from the scope of the present invention. In addition, while the second layer 76 is contemplated to be a polyimide, other materials may be substituted therefor without departing from the scope of the present invention.

Like the first layer 74, the third layer 78 may be applied as a liquid, as a solid, as a powder, or as a film, as should be apparent to those skilled in the art. It is contemplated that the third layer 78 will be applied as a liquid or as a film, but the present invention should not be considered to be limited solely to the contemplated constructions.

The third layer 78 is contemplated to differ from the first layer 74 in that additional sealant beads 84, 86, 88 are provided on the first layer 74. The first additional sealant bead 84 is provided at the top end of the first layer 74, adjacent to the top chamfer 38. The second additional sealant bead 86 is provided at the corner of the structural element 12 where the structural element forms a T-junction (or where the structural element 12 and the substrate 14 form a T-junction). The third additional sealant bead 88 is provided at the bottom end of the first layer 74, adjacent to the bottom chamfer 44. The additional sealant beads 84, 88 provide additional sealant material to fill the gaps established by the chamfers 38, 44. As should be apparent, the additional sealant bead 86 provides additional sealant material to fill the corners established between the vertical segment 104 and the horizontal segments 108 of the structural element 12.

While not limiting of the present invention, it is contemplated that the sealant beads 84, 88 cooperate with the chamfers 38, 44 to establish a durable seal between the brackets 66, 68 and the structural element 12. Since the beads 84, 88 are positioned between the chamfers 38, 44 and the structural element, they are protected from sloshing within the fuel tank such that even if erosion of a top portion of the beads 84, 88 should erode, there is still sufficient sealant within the chamfer to prevent air pockets from forming between the brackets 66, 68 and the structural element 12. In particular, the chamfers 38, 44 establish spaces with gradient openings that accommodate the sealant beads 84, 88, providing a larger area of attachment between the brackets 66, 68 and the structural element 12 and/or substrate 14, and less risk of air pockets forming. As a result, there is a smaller likelihood of damage if the repair 64 is exposed to high voltage. Finally, the chamfers 38, 44 establish locations where greater thicknesses of sealant are deposited by comparison with the repair 10. In particular, the sealant accumulates in the spaces created by the chamfers 38, 44, which does not occur in the prior art repair 10. As a result, there is a smaller likelihood that the sealant 84, 88 might be removed inadvertently from the repair 64, as might occur in the prior art construction. (With renewed reference to FIG. 1, it is noted that the sealant 28 might be inadvertently removed if, for example, a maintenance person were to strike the sealant 28 with a tool.) In summary, the chamfers 38, 44 offer a number of advantages over the prior art.

In an alternative, contemplated embodiment, it is contemplated that one or more of the additional sealant beads 84, 86, 88 may be provided in connection with the third layer 78 without departing from the present invention.

Figure 4:
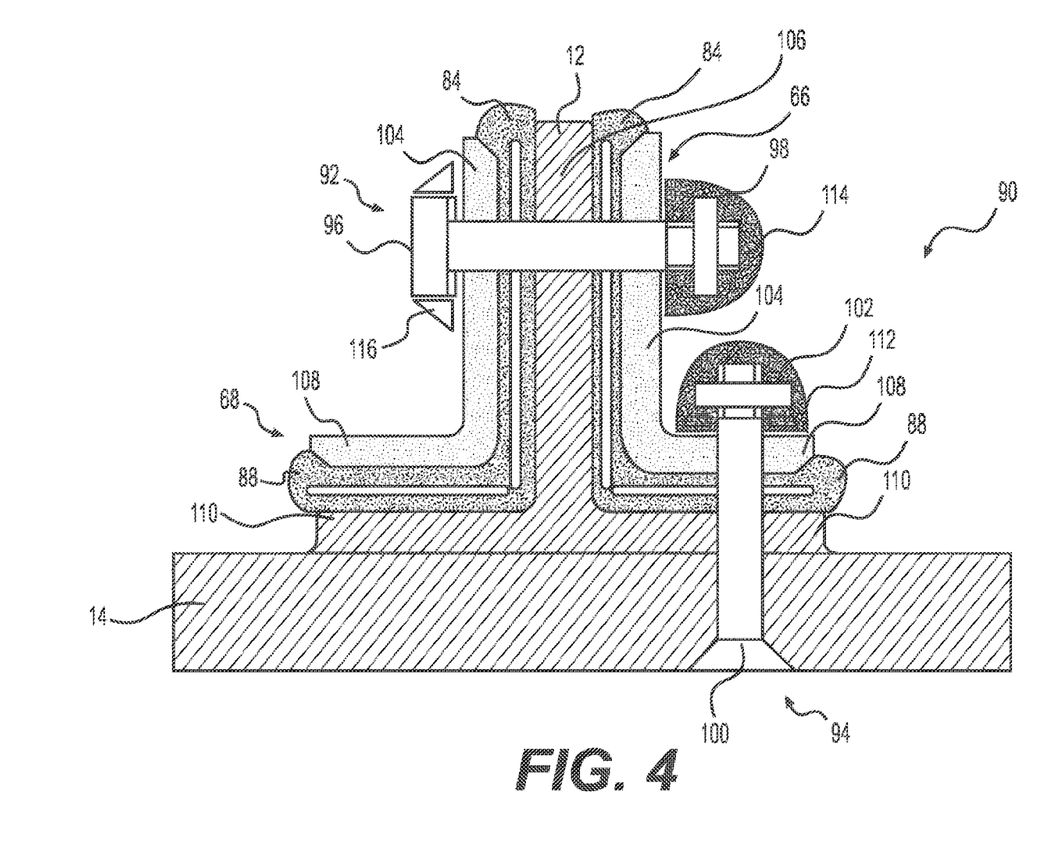
FIG. 4 is a graphical, side view of the construction of a second embodiment of a repair for a structural element made from a composite material, as contemplated by the present invention.

FIG. 4 is a graphical side view of a second embodiment of a repair 90 according to the present invention. This embodiment is contemplated to be the same as the first embodiment illustrated in FIG. 3. However, in this illustration, two fasteners 92, 94 are added.

In the embodiment illustrated in FIG. 4, the first fastener 92 comprises a first threaded member 96 and a first nut 98 that connect the vertical segments 104 of the brackets 66, 68 to the vertical segment 106 of the structural element 12. The second fastener 94 comprises a second threaded member 100 and a second nut 102 that connects the horizontal segment 108 of the bracket 66 to one of the horizontal segments 110 of the structural element 12 and also to the substrate 14.

As should be apparent to those skilled in the art, the horizontal segment 108 of the second bracket 68 also may be bolted to the other one of the horizontal segments 110 of the structural element 12 and the substrate 14 without departing from the scope of the present invention.

As illustrated in FIG. 4, the first threaded member 96 may be a bolt. The second threaded member 100 may be a flat-headed screw. The exact construction of the threaded member 96, 100 is not critical to the present invention. Different threaded members 96, 100 may be selected based on the positioning of the threaded member 96, 100 and other variables that should be apparent to those skilled in the art.

Separately, it is contemplated that any suitable fastener may be substituted for the fasteners 92, 94 without departing from the scope of the present invention.

As also illustrated in FIG. 4, it is contemplated that selected, exposed ends of the threaded members 96, 100 may be encased in sealant 112, 114, 116. The sealant encapsulations 112, 114, 116 are contemplated to electrically isolate the ends of the threaded members 96, 100 from the adjacent structures, particularly the metal brackets 66, 68.

As discussed above, FIG. 5 graphically illustrates a chamfered bracket component 118. While the bracket 68, the first layer 74, the second layer 76, and the third layer 78 are shown as being separated from one another, elements 68, 74, 76, 78 are contemplated to be adhered to one another in a pre-cured state. As may be apparent, during curing, the sealant from the layers 74, 78 and the sealant beads 84, 86, 88 will migrate to fill any voids adjacent thereto, thereby assuring, among other things, a uniform, bubble-free connection.

As noted above, the embodiment(s) described herein are intended to be exemplary of the wide breadth of the present invention. Variations and equivalents of the described embodiment(s) are intended to be encompassed by the present invention, as if described herein.

What is claimed is:

1. A repair for a structural element made from a composite material, comprising:
    a bracket defining a first surface and a second surface, the first surface adapted for facing the structural element, and a chamfer located on a first end of the bracket, wherein an angle is defined between a plane of the chamfer and a plane of the first surface, the first surface of the bracket being adapted to be disposed adjacent to a side of the structural element; and
    a sealant material between the bracket and the structural element, wherein the sealant material occupies a space established between the chamfer and the structural element,
    wherein the bracket defines a first side, a second side, and a third side, the second side extending between the first side and the third side, the chamfer extending between a first position on the first side and a second position on the second side.

2. The repair of claim 1, wherein the chamfer defines a chamfer thickness as a distance measured from the first position to the second position along a line normal to the plane of the first surface,
    wherein a bracket thickness is defined as a distance measured from the first side to the third side along the line normal to the plane of the first surface, and
    wherein the chamfer thickness is less than the bracket thickness.

3. The repair of claim 1, wherein the chamfer is a first chamfer, the bracket comprising a second chamfer located on a second end of the bracket.

4. The repair of claim 1, further comprising a polyimide film between the bracket and the structural element.

5. The repair of claim 4, wherein the polyimide film is positioned between two layers of sealant material.

6. The repair of claim 1, wherein the bracket comprises at least one of titanium, alloys of titanium, aluminum, alloys of aluminum, iron, alloys of iron, steel, plastics, composite materials, and ceramics.

7. The repair of claim 1, wherein the angle is between about 20°-70°.

8. The repair of claim 1, wherein the chamfer thickness is at least one of greater than about 0.020 inches (0.51 mm), greater than about 0.025 inches (0.64 mm), greater than about 0.030 inches (0.76 mm), greater than about 0.035 inches (0.89 mm), and greater than about 0.04 inches (1.02 mm).

9. The repair of claim 1, wherein the ratio of the chamfer thickness to the bracket thickness is at least one of about 0.50, about 0.45-0.55, about 0.40-0.60, or about 0.35-0.65.

10. The repair of claim 1, further comprising:
    a second bracket with a construction identical to the first bracket, the second bracket being adapted to be disposed adjacent to a second side of the structural member made from the composite material.

11. The repair of claim 1, further comprising:
    at least one fastener adapted to connect the bracket to the structural member.

* * * * *